(12) United States Patent
Schmidt et al.

(10) Patent No.: US 10,550,957 B2
(45) Date of Patent: Feb. 4, 2020

(54) CONTROL DEVICE AND SYSTEM

(71) Applicant: FESTO AG & Co. KG, Esslingen (DE)

(72) Inventors: Ulrich Schmidt, Reutlingen (DE); Jan Reich, Filderstadt (DE); Christian Kohler, Weissach (DE); Andreas Siebel, Neuffen (DE); Stefan Elmer, Pfedelbach (DE)

(73) Assignee: FESTO AG & Co. KG, Esslingen (DE)

( * ) Notice: Subject to any disclaimer, the term of this patent is extended or adjusted under 35 U.S.C. 154(b) by 0 days.

(21) Appl. No.: 15/482,238

(22) Filed: Apr. 7, 2017

(65) Prior Publication Data

US 2017/0307102 A1 Oct. 26, 2017

(30) Foreign Application Priority Data

Apr. 22, 2016 (DE) .................. 10 2016 206 874

(51) Int. Cl.
| | | |
|---|---|---|
| *F16K 37/00* | (2006.01) | |
| *F16K 31/02* | (2006.01) | |
| *H04L 12/40* | (2006.01) | |
| *H04L 29/08* | (2006.01) | |

(52) U.S. Cl.
CPC .......... *F16K 37/0025* (2013.01); *F16K 31/02* (2013.01); *H04L 12/40019* (2013.01); *H04L 67/12* (2013.01); *H04L 2012/4026* (2013.01); *H04L 2012/40215* (2013.01)

(58) Field of Classification Search
CPC ................. F16K 37/0025; F16K 31/02; H04L 12/40019; H04L 2012/4026; H04L 2012/40215; H04L 67/12
USPC ........................................................ 700/282
See application file for complete search history.

(56) References Cited

U.S. PATENT DOCUMENTS

| | | | | |
|---|---|---|---|---|
| 2003/0088338 A1* | 5/2003 | Phillips | ................ | B67D 1/1204 |
| | | | | 700/282 |
| 2006/0233119 A1* | 10/2006 | Cline | ..................... | H04L 29/06 |
| | | | | 370/257 |
| 2008/0154436 A1* | 6/2008 | Krippner | .............. | G05D 7/0635 |
| | | | | 700/282 |
| 2008/0316856 A1* | 12/2008 | Cooley | ................... | B28C 5/422 |
| | | | | 366/142 |
| 2011/0004685 A1* | 1/2011 | De Groot | .......... | G05B 19/0425 |
| | | | | 709/225 |

(Continued)

FOREIGN PATENT DOCUMENTS

| | | |
|---|---|---|
| DE | 10250250 | 5/2004 |
| DE | 102008010864 | 8/2009 |

(Continued)

*Primary Examiner* — Ziaul Karim
(74) *Attorney, Agent, or Firm* — Hoffmann & Baron, LLP

(57) ABSTRACT

A control device for a process valve unit which includes a valve drive and a valve fitting, wherein the control device has a control unit which is configured to receive a control signal from a superordinate control via a communication interface which is provided in the field level, and to control the valve drive in accordance with the control signal, wherein the control device further has a local bus interface and the control unit is constructed to communicate with one or more devices of the field level via the local bus interface.

8 Claims, 1 Drawing Sheet

(56) References Cited

U.S. PATENT DOCUMENTS

2012/0233370 A1* 9/2012 Kolblin ............... G05B 19/042
                                                    710/305
2014/0107810 A1* 4/2014 Johnson ............... G05B 19/042
                                                    700/19
2014/0122754 A1* 5/2014 Gutermuth ......... G05B 19/0423
                                                    710/104

FOREIGN PATENT DOCUMENTS

| DE | 102009045901 | 4/2011 | |
|----|--------------|--------|----|
| DE | 102011107318 | 1/2013 | |
| EP | 1560094 | 8/2005 | |
| WO | WO 2004038520 A3 * | 1/2005 | ......... G05B 19/0423 |

* cited by examiner

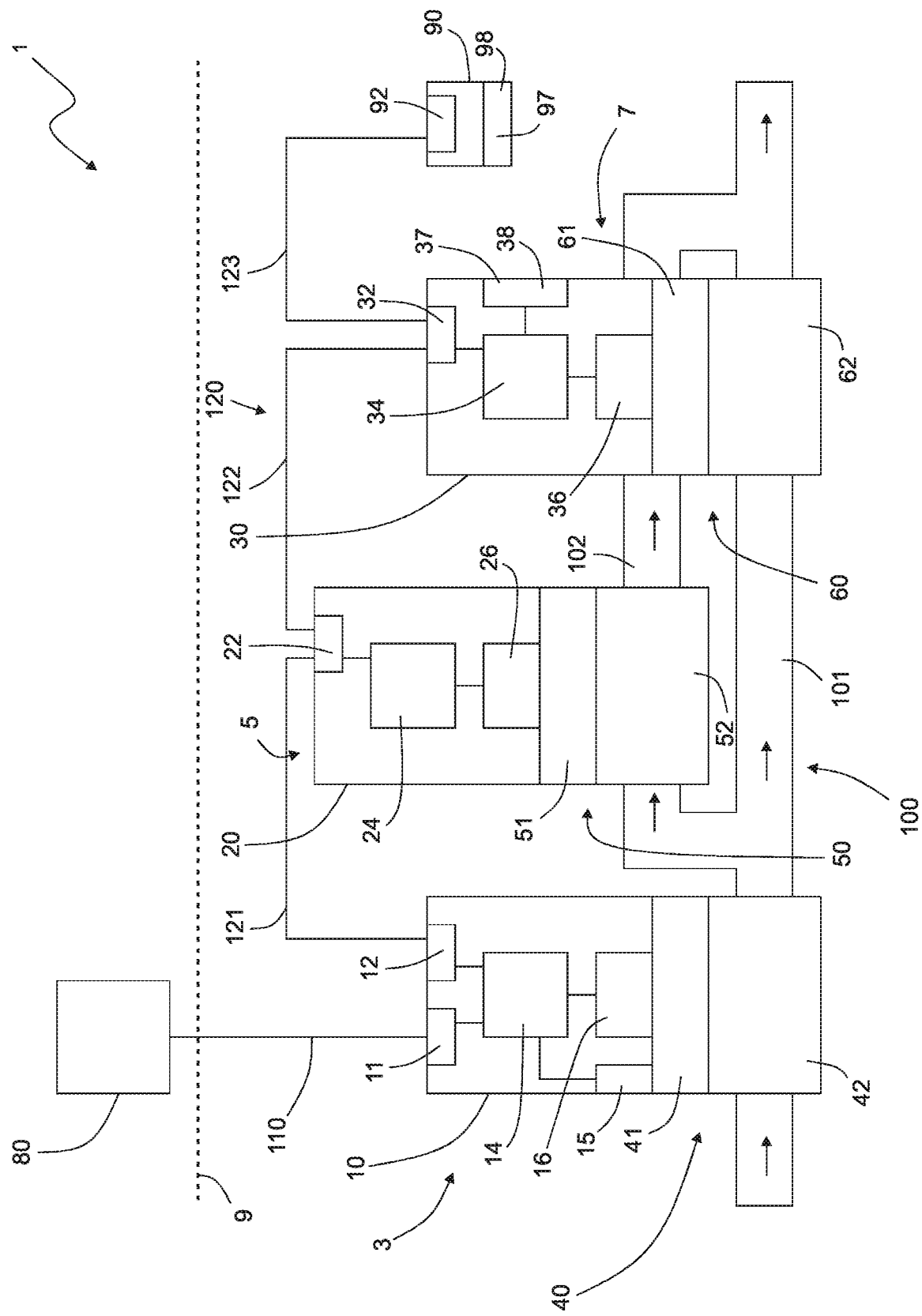

CONTROL DEVICE AND SYSTEM

BACKGROUND OF THE INVENTION

The invention relates to a control device for a process valve unit which has a valve drive and a valve fitting, wherein the control device has a control unit which is configured to receive a control signal from a superordinate control, preferably a memory-programmable control such as a programmable logic controller, via a communication interface which is provided in the field level, and to control the valve drive in accordance with the control signal.

Such a control device can be constructed as a positioner, position adjuster and/or control head and is used to set the position of a valve member of the valve fitting by controlling the valve drive. A process fluid flows through the valve fitting during operation. By setting the valve member, a process fluid flow can be controlled. The valve member can be moved, for example, into an open or closed position in order to release or block the process fluid flow. It may further be possible to move the valve member into one or more positions between the open and closed position in order thus to set a throughflow rate of the process fluid flow.

The control of the valve drive by the control device is brought about in accordance with a control signal which is produced by the superordinate control—for example, a memory-programmable control such as a programmable logic controller (PLC) from the control level—and which is transmitted to the field level via a communication connection. The control signal can be transmitted in a message, for example. In the field level, the control signal is received by a communication interface which can be provided, for example, at the control device. The communication interface is in particular a digital interface, such as, for example, a field bus interface, or an analogue interface, such as, for example, an analogue current interface.

The control of the valve drive in accordance with the control signal is carried out in particular on the basis of a control and/or regulator model which is adapted to the valve fitting or the valve drive and which is stored in the control unit. The control and/or regulator model can preferably be adapted to the valve fitting or the valve drive by configuration parameters.

From the prior art, it is known to provide a control device with a maintenance interface, to which a manual operation device, for example, a maintenance device, in particular a handheld device, can be directly connected in order to carry out specific maintenance processes. In this instance, the maintenance interface is typically constructed as a point-to-point interface, that is to say, the maintenance interface is only suitable for establishing a direct connection with a single connected device—the manual operation device—and for communicating therewith.

SUMMARY OF THE INVENTION

An object of the invention is to improve a control device of the type mentioned in the introduction so that more versatile possible uses are provided in an efficient manner and to make it possible to provide additional functions.

This object is achieved by a control device which has a local bus interface and the control unit of which is configured to communicate with one or more devices of the field level via the local bus interface.

Since the control device has the local bus interface, it can be connected as a participant in a local bus. The local bus may be in particular a bus in the field level—that is to say, a bus via which only devices present in the field level communicate with each other, such as, for example, field devices. As a result of the communication possibility provided by the local bus interface with respect to additional devices present in the field level, the control device can be used in a more versatile manner and, in particular in conjunction with the additional devices, can provide additional functions. The additional devices of the field level may be in particular additional control devices according to the invention and/or mobile or stationary devices of the field level, in particular field devices.

The local bus interface and the communication interface are preferably different bus interfaces—that is to say, the local bus interface and the communication interface are not compatible with each other. The local bus interface and the communication interface are used in particular to provide connections with respect to two mutually incompatible communication systems or bus systems—hereinafter also referred to as a local bus and communication connection, respectively. The local bus is preferably provided only in the field level while the communication connection is preferably used for communication between different levels, in particular between the field level and the control level. For example, a field bus which is used for communication between the different levels, in particular between the field level and the control level, can be used as the communication connection.

Further embodiments are discussed below.

Preferably, the local bus interface is an interface for a multi-master bus. In particular, the local bus interface is a CAN interface, an RS485 interface or an M-LVDS interface.

Accordingly, the control device can be connected to a multi-master bus. A multi-master bus is a bus which allows a plurality of masters, that is to say, participants, which can gain access or transmit to the bus autonomously. A plurality of control devices according to the invention can e.g. form a multi-master bus. Consequently, control devices according to the invention can be combined in any composition to form a local bus without it being necessary to ensure a specific master/slave classification or assignment of the control devices.

In a preferable manner, the local bus interface is constructed as a CAN interface.

The communication connection or the field bus for which the communication interface is provided is, however, advantageously a bus with master/slave division of the bus participants. Preferably, the field bus is not a multi-master bus.

In a preferred embodiment, the control unit is constructed to carry out control, configuration and/or maintenance processes via the local bus interface in cooperation with a manual operation device, in particular a handheld device, which is or can be connected to the local bus interface, preferably directly.

Preferably, the local bus interface replaces a maintenance interface which is arranged on a control device according to the prior art and which is provided separately for carrying out maintenance processes, such as, for example, the point-to-point maintenance interface which has already been mentioned above. That is to say, the control device in particular does not have, in addition to the local bus interface, any additional maintenance interface, in particular not a dedicated and/or point-to-point maintenance interface.

In place of a maintenance interface which can be used only for maintenance processes and which generally remains unused for most of the time, there is accordingly provided the local bus interface, via which maintenance processes can also be carried out and with which, in addition, a local bus can be formed with additional devices of the field level. The local bus interface provides, as a result of the possibility of being able to participate in a local bus, a large number of additional possible uses which are explained below in detail in comparison with the conventional maintenance interface. At the same time, the local bus interface can be implemented in an extremely efficient manner—that is to say, without increasing the total production complexity of the control device significantly—because it can be provided in place of the maintenance interface so that the total number of interfaces does not have to be increased.

When the configuration and/or maintenance processes are carried out, in particular configuration and/or maintenance data are transmitted from the control unit via the local bus interface to the manual operation device, in particular a handheld device, and/or received therefrom. For example, the control unit transmits recorded operating, state, sensor, diagnosis and/or error information to the manual operation device or receives it from the manual operation device. Furthermore, there can be transmitted between the manual operation device and the control unit configuration parameters, software functions and/or operation software, such as, for example, firmware.

Advantageously, the manual operation device is arranged in the field level as are the additional devices of the field level and the control device itself.

The manual operation device may be constructed, for example, as a mobile device, in particular as a transportable computer, laptop, tablet, handheld device and/or mobile telephone.

According to another embodiment, the control unit is constructed to allow via the local bus interface use of at least one functional unit of the control device by one or more of the devices of the field level.

In particular a unit which provides or carries out a specific function in response to a command or a control operation is intended to be referred to as a functional unit in this context.

Preferably, the at least one functional unit is a unit which is comprised by the control device and which is not itself provided in one or more of the devices of the field level which can use it. For example, the functional unit is a display unit, such as, for example, a display. For example, messages which relate to use of at least one functional unit, such as, for example, the display unit mentioned, can be received by the control unit via the local bus interface. The control unit is constructed in particular to carry out corresponding control of the at least one functional unit in accordance with the messages received. In the mentioned example of a display unit as the at least one functional unit, the message received via the local bus interface may relate, for example, to the display of specific data by the display unit. The control unit receives this message via the local bus interface and then carries out corresponding control of a display unit which is provided on the control device in order to display specific data on the display unit in accordance with the message.

In this manner, a very efficient use of functional units of the control device becomes possible because those functional units can now be used not only by the control device alone but also in addition by the devices of the field level which are connected to the control device via the local bus.

According to another preferred embodiment, the control unit is constructed to use at least one functional unit of at least one of the devices of the field level via the local bus interface.

This use of a functional unit of the devices of the field level by the control unit can be brought about by the devices of the field level in a conversely similar manner to the above-described use of a functional unit of the control device.

In particular, the control unit is constructed in this case to output a message in relation to the use to be carried out to the local bus via the local bus interface. The device of the field level which comprises the functional unit which is intended to be used receives the communication via the local bus and carries out control of the functional unit in accordance with the message received.

In this manner, the control device can use additional functions without itself having to have corresponding functional units for the purpose.

The at least one functional unit comprises in particular a display unit, an input unit, a sensor unit, an actuator unit, an interface unit, preferably the communication interface, and/or a computation unit.

The case in which the functional unit is a display unit has already been discussed above and shall not be repeated at this point.

If the functional unit is an input unit, such as, for example, a keyboard, a button and/or a touch screen, and if the input unit is provided on a device of the field level connected to the control device via the local bus, there can be carried out via the input unit a user input which is then output by the device of the field level in a message to the local bus. The control unit can be configured to receive this message via the local bus interface, to read the user input contained in the communication and to carry out, in response thereto, an operation which is instructed by the user input. The user input can be carried out in response to a request which is output by a display unit of the device of the field level. Preferably, the request is produced in response to a message which is output by the control unit via the local bus interface and which is received by the device of the field level.

If, however, the input unit is provided on the control device, the control unit can be configured to output a user input, which is input via the input unit, to the local bus via the local bus interface in a message so that the message and the user input contained therein can be received and accordingly evaluated by one of the devices of the field level.

If the functional unit is a sensor unit, sensor signals which are provided by the sensor unit can be exchanged via the local bus between the control device and the devices of the field level. The sensor unit can be, for example, a temperature sensor which is provided directly on the control device or a process sensor which is connected to the control device. For example, the sensor unit may be configured to detect a measured quantity in relation to the process fluid flow, such as, for example, a pressure, a temperature or a throughflow rate.

For example, the sensor unit can be provided on the control device or be associated therewith. In this case, the control unit can be constructed to output to the local bus via the local bus interface a sensor signal, which is provided by the sensor unit, in a message so that the message and the sensor signal contained therein can be received by the devices of the field level. The control unit can be configured to output, via the local bus, the sensor signal, which is provided by the sensor unit, in response to a request from a device of the field level.

Furthermore, the sensor unit can be provided on one of the devices of the field level and this device of the field level can be configured to output a sensor signal, which is provided by the sensor unit, in a message to the local bus. In this case, the control unit can be constructed to receive the message via the local bus interface, to read the sensor signal from the communication and, optionally, to adapt its operation, preferably the control of the valve drive, in accordance with the transmitted signal, i.e. the sensor signal.

Furthermore, the functional unit may be an actuator unit, in particular an actuation unit, such as, for example, an I/P converter—that is to say, a converter which converts an electric signal into a pneumatic signal. The actuator unit can be provided, for example, on the control device and can be used to carry out control of the valve drive in accordance with control by the control unit in order to bring about actuation of the valve fitting. The control unit can be constructed to carry out control of the actuator unit, for example in order to put the valve fitting into a closed or open position, in accordance with a message which is received via the local bus interface and which, for example, was produced by one of the devices of the field level. It may thereby be possible for the devices of the field level to set the position of the valve fitting.

Alternatively to the above-described pneumatic embodiment, the actuation of the valve fitting can also be carried out electrically. In this case, an electric drive which is controlled by the control unit can be provided as an actuator unit.

Furthermore, it is also possible for an actuator unit to be provided on one of the devices of the field level and the control unit to be configured to produce a message and to output it via the local bus interface which causes the device of the field level having the actuator unit to carry out control of the actuator unit as instructed by the message. The control device can thereby control actuator units of other devices of the field level.

If the functional unit is an interface unit, such as, for example, the communication interface already discussed above, and if the interface unit is provided on the control device, the control unit can be configured to receive via the local bus interface messages, which are output from the devices of the field level to the local bus and which are directed to the superordinate control, and to output them via the communication interface to the superordinate control. Furthermore, the control unit can be configured to output messages, which it receives from the superordinate control via the communication interface, via the local bus interface to the devices of the field level.

If the interface unit is provided on one of the devices of the field level and, for example, configured as a communication interface which provides a communication connection to the superordinate control, the control unit can be configured to transmit messages, which are directed to the superordinate control, via the local bus interface to the device of the field level. The device of the field level can then transmit the message via the interface unit to the superordinate control. Furthermore, the control unit can be configured to receive via the local bus interface messages from the device of the field level, which messages the device of the field level has received from the superordinate control via the communication interface, which is provided on the device of the field level, and which messages the device of the field level has output to the local bus.

By forwarding messages, which are received via the communication interface, a redundancy of communication paths can be provided in order to increase the operational reliability of the system.

For example, two devices of the field level which are connected to each other via the local bus, for example, two control devices according to the invention or a control device and an additional device, may each have a respective communication interface for communication with the superordinate control. In order to obtain redundancy of the communication paths, both devices can be configured to output the messages, which are received from the superordinate control via the communication interfaces, to the local bus so that the messages can be received by the other device via the local bus. In this manner, each of the two devices receives the messages from the superordinate control via two different communication paths—firstly, directly via the individual communication interface and, secondly, indirectly via the communication interface of the other device and the local bus. If one of the two communication paths is interrupted, communication is still possible via the other communication path. The described redundancy can be provided in a similar manner for messages from the devices of the field level to the superordinate control. In particular, the redundancy can be provided by each of the devices transmitting the messages, which are directed to the superordinate control, via the individual communication interface and, in addition, via the local bus and the communication interface of the other device to the superordinate control.

Furthermore, the functional unit may also be a computing unit, for example, a microprocessor. Tasks which are computationally intensive and the results of which are required by one of the participants of the local bus, for example, the control device or the devices of the field level, for example, in order to control the valve fitting, can thereby be carried out by a different participant of the local bus, preferably by a participant which has a microprocessor which is particularly powerful in terms of computation. The tasks which are computationally intensive may relate, for example, to a control and/or regulator model by means of which control of the valve drive or the valve fitting is performed.

If the control device has a corresponding computation unit, for example, as part of the control unit, the control unit can be configured to receive messages which are output from devices of the field level via the local bus interface and which relate to tasks which are intended to be carried out or computed by the computation unit. The control unit can be configured to cause, in accordance with the messages, the computation unit to carry out or compute tasks which are instructed in the messages and to output the results in messages via the local bus interface to the devices of the field level.

If the computation device is provided on one of the devices of the field level, the control unit can be constructed to output via the local bus interface messages which relate to tasks which are intended to be carried out or computed by the computation unit and to receive via the local bus interface messages in which the results of the tasks are contained. The control unit can then, for example, carry out the control of the valve drive or the valve fitting in accordance with the results obtained.

The control unit is preferably configured to transmit, via the local bus interface, a message about functional units of the control device to one or more of the devices of the field level.

In this manner, the control unit can notify the devices of the field level which are connected to the local bus about the functional units which it has. In particular, the control unit communicates to other devices of the field level the functional units which can be used by the devices of the field level. The devices of the field level are consequently informed about which functional units are available to them via the local bus.

The transmission of the message can preferably be carried out periodically, during initial connection of the control device to the local bus and/or in response to a specific action, for example, the receipt of a message or a specific user action or user input, such as, for example, a key being pressed.

Preferably, the control unit is configured to receive via the local bus interface a message about functional units of one or more of the devices of the field level.

In this manner, the control device can be informed as to which functional units are available for use via the local bus. In particular, the control unit is configured to internally set up or store a corresponding listing of functional units which are available. Advantageously, the control unit is configured to adapt its operation in accordance with the functional units available.

According to another embodiment, the control unit is configured to transmit via the local bus interface configuration parameters of the control unit, preferably configuration parameters of a control and/or regulator model of the control unit, to an additional control device.

This embodiment is used in particular for simple replacement of the control device. If the control device is intended to be replaced, for example, when it is defective or has exceeded a predetermined service-life or number of cycles, a replacement control device can be connected to the control device which is intended to be replaced via the local bus or by means of the local bus interface and the configuration parameters required by the replacement control device can be transmitted via the local bus interface to the replacement control device. The configuration parameters may be, for example, configuration parameters of a regulator and/or control model of the control unit in accordance with which the valve drive is controlled.

There is further provided according to the invention a system comprising at least a first and a second of the control devices according to the invention which are discussed above. The two control devices are connected to each other in a communicative manner via the respective local bus interfaces thereof.

The two control devices together form a local bus. In particular, both control devices are arranged in the field level. Preferably, the two control devices constitute field devices or devices of the field level.

The first control device preferably comprises at least one functional unit, preferably a display unit, an input unit, a sensor unit, an actuator unit, an interface unit, preferably the communication interface, and/or a computation unit, and the second control device is configured to use the at least one functional unit via the local bus interfaces.

Advantageously, the system comprises a first process valve unit having a first valve drive and a first valve fitting, wherein the first control unit is configured to control the first valve drive in order to actuate the first valve fitting, and a second process valve unit having a second valve drive and a second valve fitting, wherein the second control unit is configured to control the second valve drive in order to actuate the second valve fitting.

In particular, the first control device has a communication interface, preferably a field bus interface, via which a control signal can be received from a superordinate control, preferably a memory-programmable control, and the first control unit is configured to control the first valve drive in accordance with the control signal and to transmit a message to the second control unit in accordance with the control signal via the local bus interfaces, and the second control unit is configured to control the second valve drive in accordance with the message.

In this manner, two valve drives can be controlled by one control signal of the superordinate control. A particular configuration of the superordinate control is not necessary to do this; that is to say, the superordinate control does not have to have any knowledge of the second valve drive.

Advantageously, the system comprises a pipe arrangement, through which a process fluid flows, wherein the first and second valve fittings are arranged in a parallel or series manner in the pipe arrangement with respect to the process fluid flow.

In a parallel arrangement of the valve fittings in relation to the process fluid flow, the switching capacity or circuit capacity of the system can be increased. If the valve fittings arranged parallel with each other are both in the open position, a greater throughflow area is available for the process fluid flow. The control of the two valve fittings can be carried out without corresponding configuration or knowledge of the superordinate control, due to the provision of the local bus and the forwarding of the control signal, as already explained above.

It is in particular possible to arrange valve fittings with different throughflows—for example, a first valve fitting with a small throughflow and a second valve fitting with a high throughflow—parallel with each other. It is thereby possible to achieve a higher control accuracy for the control of a throughflow.

In the case of a serial arrangement of the valve fittings with respect to the process valve flow, the operational reliability of the system can be increased. If the first control unit receives, for example, an emergency stop signal or closure signal from the superordinate control, it can forward this in a message via the local bus to the second control device so that both control devices move the valve fittings controlled by them into a closed position. If one of the valve fittings cannot be moved into the closed position as a result of a defect, the process fluid flow is nevertheless blocked by the other valve fitting which is arranged in series relative to the defective valve fitting. In this case, it is also unnecessary for the superordinate control to be configured accordingly.

BRIEF DESCRIPTION OF THE DRAWINGS

Exemplary embodiments of the above-discussed control device and the system are explained below with reference to the drawing. In the drawing:

FIG. 1 shows a block diagram of a system having three control devices.

DETAILED DESCRIPTION

FIG. 1 shows a system 1 having a first control device 10, a second control device 20 and a third control device 30. In this case, each of the control devices 10, 20, 30 already constitutes by itself a possible embodiment of the present invention. The control devices 10, 20, 30 are in particular constructed as positioners, position controllers and/or control heads.

In the following, the system 1, which constitutes an exemplary operating environment of each of the three control devices 10, 20, 30, will be explained first.

The system 1 comprises a field level and a control level which is superordinate to the field level. The delimitation between the field level and the superordinate control level is indicated in FIG. 1 by the broken line 9.

There is provided in the control level a control 80 which is constructed, for example, as a memory-programmable control, in particular a programmable logic controller (PLC).

In the field level, the system 1 comprises three subassemblies 3, 5 and 7. Each subassembly has a process valve unit 40, 50, 60 and a control device 10, 20, 30 which is positioned thereon by way of example. The first process valve unit 40 is associated with the first control device 10, the second process valve unit 50 is associated with the second control device 20 and the third process valve unit 60 is associated with the third control device 30.

The control devices 10, 20, 30 are connected to each other via line portions 121 and 122 and thus combined to form a local bus 120. The local bus is in particular a multi-master bus, preferably a CAN bus.

The system 1 further comprises a manual operation device 90 which is preferably constructed as a maintenance device and which is connected to the local bus 120 via a line portion 123. The manual operation device 90 has a local bus interface 92, a display unit 97 and an input unit 98.

The system 1 further comprises a pipe arrangement 100, through which a process fluid flows.

The process valve units 40, 50, 60 each comprise valve drives 41, 51, 61 and valve fittings 42, 52, 62. The valve drives 41, 51, 61 are controlled by the associated control device 10, 20, 30 and serve to actuate the valve fittings 42, 52, 62. The valve fittings 42, 52, 62 are, for example, oblique seat fittings, in particular angle seat fittings.

The valve fittings 42, 52, 62 are used to control or regulate the process fluid flow in the pipe arrangement 100.

The arrangement of the valve fittings 42, 52, 62 as shown in FIG. 1 in the pipe arrangement 100 is purely exemplary. The valve fittings 42, 52, 62 can, where applicable, be arranged differently and in particular also be arranged in different or a plurality of pipe arrangements.

The control device 10 is constructed to receive a control signal from the superordinate control 80 via a communication connection 110 which is constructed as a field bus by way of example. The control signal of the control 80 is received by a communication interface 11 which is present in the field level and which is constructed as a field bus interface by way of example.

In the example shown, the communication interface 11 is provided on the first control device 10. Alternatively to the example shown, it is also possible for the communication interface 11 to be constructed as an independent unit.

In the example shown, the control devices 20 and 30 do not have an individual or own communication interface for communication with the superordinate control 80. However, it is also possible for the second control device 20 and/or the third control device 30 also each to have a corresponding communication interface which is connected to the superordinate control 80 via a communication connection, in particular the field bus 110.

The basic cooperation between the control device, valve drive and valve fitting is carried out in an identical manner for the three subassemblies 3, 5 and 7 shown in FIG. 1 so that the subsequent explanation of the first subassembly 3 also applies accordingly to the other two subassemblies 5 and 7.

The first control device 10 has a first control unit 14 which is configured to carry out control of the valve drive 41 in accordance with the control signal from the superordinate control 80. For this purpose, the control unit 14 outputs a corresponding signal to an actuation unit 16 of the control device 10. The actuation unit 16 is, for example, an I/P converter—that is to say, a converter which converts an electric signal into a pneumatic signal. In this case, the actuation unit 16 comprises, for example, a control valve which is in particular constructed as a solenoid valve and which is connected to a compressed air supply which is not shown in FIG. 1.

The signal output by the actuation unit 16—in the example being discussed here, a pneumatic signal—is output to the valve drive 41. The valve drive 41 is, for example, constructed as a pneumatic valve drive, in particular as a pneumatic rotary drive. Advantageously, the valve drive 41 has one or more pressure chambers which are not shown in the FIGURE and which can be acted on with pressure by the pneumatic signal which is provided by the actuation unit 16 in order thus to move an actuation element of the valve drive 41, for example, a piston, which actuation element is not shown in FIG. 1. The actuation element of the valve drive 41 is mechanically connected to a valve member of the valve fitting 42, which valve member is not shown in FIG. 1, so that a position change of the valve member can be achieved by means of a position change of the actuation element.

The valve fitting 42 is arranged in the pipe arrangement 100 of the system 1 and process fluid flows through it. The flow of the process fluid can be controlled by a position change of the valve member.

Each of the three control devices 10, 20, 30 is explained below in detail. As already mentioned above, each of the three control devices 10, 20, 30 already constitutes by itself an embodiment of the present invention.

The first control device 10 constitutes a first exemplary embodiment of the invention. The first control device 10 comprises a first local bus interface 12. The first control unit 14 is configured to communicate with the control devices 20, 30 and/or the manual operation device 90 via the local bus interface 12. The local bus interface is configured in particular as an interface for a multi-master bus, preferably as an interface for a CAN bus.

Due to the communication possibility provided by the first local bus interface 12 with the control devices 20, 30 and the manual operation device 90, the first control device 10 can be used in a more versatile manner and can provide additional functions, in particular in cooperation with the control devices 20, 30 and the manual operation device 90.

For example, the first control unit 14 is configured to carry out control, configuration and/or maintenance processes in cooperation with the manual operation device 90. The manual operation device 90 can, as shown in FIG. 1, be connected to the local bus 120 via the line portion 123. In the example shown, the manual operation device 90 is connected to the third control device 30. Alternatively, however, the manual operation device 90 can also be connected directly to the first local bus interface 12 of the first control device 10.

The first control device 10 which is shown in FIG. 1 comprises a plurality of functional units. In particular, the control device 10 comprises the communication interface 11 which has already been discussed above, a sensor unit 15 and an actuation unit 16.

The first control unit 14 is configured to allow, via the first local bus interface 12, use of at least one functional unit of the first control device 10 by the control devices 20, 30 and/or the manual operation device 90.

For example, the first control unit 14 can be configured to allow use of the communication interface 11 by the control devices 20, 30 and/or the manual operation device 90. Thus, the first control unit 14 can be configured in particular to receive messages output to the local bus 120 from the second control device 20, the third control device 30 and/or the manual operation device 90 via the first local bus interface 12 and, if those messages are directed to the superordinate control 80, to output them via the communication interface 11 to the communication connection 110 so that the messages can be received by the control 80. Consequently, the second control device 20, the third control device 30 and/or the manual operation device 90 can transmit messages to the superordinate control 80 without them having to have for this purpose a corresponding communication interface, for example, a field bus interface, for direct communication via the communication connection 110.

Furthermore, the first control unit 14 can be configured to output messages which it receives from the superordinate control 80 via the communication interface 11 via the local bus interface 12 to the control devices 20, 30 and/or the manual operation device 90. In this manner, the second control device 20, the third control device 30 and the manual operation device 90 can receive messages which are transmitted via the communication connection 110 from the control level to the communication interface 11 which is provided in the field level. In this instance, it is not necessary for the second control device 20, the third control device 30 and/or the manual operation device 90 itself to have a communication interface for direct connection to the communication connection 110.

The first control unit 14 is configured in particular to check an address and/or communication content of messages arriving at the control device 10 in order to establish whether and, where applicable, how the messages or the contents of the messages are to be forwarded via the communication connection 110 and/or the local bus 120.

The first control device 10 can be used more flexibly as a result of the local bus interface 12; this is because it can also act as a communication node for the second control device 20, the third control device 30 and/or the manual operation device 90 in order to communicate with the superordinate control 80.

The first control unit 14 can further be configured to allow use of the first sensor unit 15 by the control devices 20, 30 and/or the manual operation device 90.

In this case, the first control unit 14 can be configured to transmit sensor signals, which are provided by the first sensor unit 15, via the local bus 120 to the control devices 20, 30 and/or the manual operation device 90. The first sensor unit 15 may be, for example, a temperature sensor which is provided directly on the first control device 10 or a process sensor which is connected to the first control device 10. In this case, the process sensor can be arranged directly in the process fluid flow or in the direct vicinity thereof. In particular, the first sensor unit 15 is configured to detect a measured quantity in relation to the process fluid flow, such as, for example, a pressure, a temperature or a throughflow rate.

For example, the first sensor unit 15 is provided on the first control device 10 or is associated therewith. In this case, the first control unit 14 can be configured to output a sensor signal, which is provided by the first sensor unit 15, in a message to the local bus 120 via the local bus interface 12 so that the message and the sensor signal which is contained therein can be received by the control devices 20, 30 and/or the manual operation device 90. The first control unit 14 can be configured to output, via the local bus, the sensor signal, which is provided by the first sensor unit 15, in response to a request from the control devices 20, 30 and/or the manual operation device 90. The request can be carried out, for example, in the form of a communication via the bus 120.

In this manner, the first sensor unit 15 can be used by a plurality of devices of the field level.

The first control unit 14 is preferably configured to transmit, via the local bus interface 12, a message about the available functional units of the first control device 10 to the control devices 20, 30 and/or the manual operation device 90. In particular, the first control unit 14 is configured to transmit such a message to all the participants of the local bus 120.

The message preferably contains a listing of the available functional units.

The control unit 14 is further configured to use, via the local bus interface 12, at least one functional unit of the control devices 20, 30 and/or the manual operation device 90.

In the example shown in FIG. 1, for example, the control unit 14 can use the display unit 37 of the third control device 30 or the display unit 97 of the manual operation device 90 in order to display specific information.

The first control unit 14 of the first control device 10 is configured, for example, to produce a message for the information to be displayed and to output the message via the first local bus interface 12 to the local bus 120. The message is addressed, for example, to the third control device 30.

The third control device 30 has a third local bus interface 32, via which it receives the message from the first control device 10. The third control unit 34 of the third control device 30 is configured to carry out control of the display unit 38 in accordance with the message received so that it displays the information which is to be displayed.

In a similar manner, the first control unit 14 can be configured to transmit to the manual operation device 90 a corresponding communication which the manual operation device 90 receives via the local bus interface 92 and in accordance with which control of the display unit 97 is brought about.

In this manner, it is possible to have data of the first control device 10 displayed on a display in the field level without the first control device 10 having to have a corresponding display unit therefor.

The first control unit 14 can further be configured to use an input unit 38 which is provided on the third control device 30 and/or an input unit 98 which is provided on the manual operation device 90. The input unit 38 and 98 may be, for example, a keyboard, a button and/or a touch screen.

There can be carried out via the input unit 38 and/or 98 a user input which is then output by the third control device 30 or the manual operation device 90 to the local bus 120 in a message which is addressed to the first control device 10. The first control unit 14 can be configured to receive this message via the local bus interface 12, to read the user input contained in the message and, in response thereto, to carry out an operation instructed by the user input. The user input can be carried out in response to a request which is output by the display unit 37 or 97. Preferably, the request is carried out in response to a message which is transmitted from the first control unit 14 via the local bus interface 12 to the third control device 30 or the manual operation device 90.

The first control unit 14 is in particular configured to receive a message about functional units of one or more of the devices of the field level via the first local bus interface 12.

In this manner, the first control device 10 can acquire information as to which functional units are available for use via the local bus 120. In particular the first control unit 14 is configured to set up or to store internally a corresponding listing of available functional units. Advantageously, the first control unit 14 is configured to adapt its operation in accordance with the functional units available. For example, the first control unit 14 can be configured to output a message for using an external functional unit to the local bus 120 only when it is set out in the internal listing. In this manner, unnecessary communications can be prevented from being sent to the local bus 120.

The second control device 20 constitutes a second exemplary embodiment. The second control device 20 substantially corresponds to the first control device 10 but, unlike that device, does not have any communication interface for direct connection to the communication connection 110. Furthermore, the second control device does not have any sensor unit, in particular not an individual temperature sensor and/or an individual process sensor. The second control device 20 has a second local bus interface 22, a second control unit 24 and a second actuation unit 26. The second control device can be configured in accordance with the above-explained configuration and/or construction possibilities of the first control device 10. In particular, the second control unit 24 can be configured to use, via the second local bus interface 22, the communication interface 11, the sensor unit 15, the display unit 37, the input unit 38, the display unit 97 and/or the input unit 98.

The third control device 30 constitutes a third exemplary embodiment. The third control device 30 substantially corresponds to the second control device 20 but, unlike that device, further has the display unit 37 already mentioned above and the input unit 38. The third control device 30 has a third local bus interface 32, a third control unit 34 and a third actuation unit 36. The third control device 30 can be configured in accordance with the above-explained configuration and/or construction possibilities of the first control device 10.

In particular, the third control unit 34 can be configured to use, via the third local bus interface 32, the communication interface 11, the sensor unit 15, the display unit 97 and/or the input unit 98. Furthermore, the third control device 30 is configured to allow use of the display unit 37 and/or input unit 38 by other participants of the local bus 120, as has already been explained above. In particular, the third control unit 34 can be configured to output a user input, which is input via the input unit 38, in a message via the local bus interface 32.

As a result of the combination of the control devices 10, 20, 30 to form the local bus 120, it is further possible to readily coordinate the controls of the respective valve fittings 42, 52, 62 without the superordinate control 80 having to be accordingly configured therefor.

For example, the first control unit 14 is configured to control the first valve drive 41 in accordance with a control signal from the control 80 and to transmit a message in accordance with the control signal via the local bus interface 12 to the second control unit 20. The second control unit 20 is configured to receive the message and to control the second valve drive 51 in accordance with the message.

In a similar manner, the control of the second valve fitting 52 and the third valve fitting 62 can also be coordinated. In particular, the second and/or third control unit 24, 34 can be configured to receive a control signal with respect to a control of a valve fitting and to transmit a message which corresponds to this control signal to the third or second control device 30, 20 via the local bus 120 so that it carries out corresponding control of the third or second valve fitting 52, 62.

Such coordination is particularly advantageous in the example shown because the valve fittings 52 and 62 are arranged parallel with each other with respect to the process fluid flow. In the example shown in FIG. 1, the process fluid flows from left to right through the pipe arrangement 100, as indicated by the arrows indicated in the pipe arrangement 100. In this case, the process fluid flows first through the first valve fitting 42, is then divided into two pipe portions 101 and 102 which are in parallel with each other, wherein the process fluid in the first pipe portion 101 flows through the second valve fitting 52 and the process fluid in the second pipe portion 102 flows through the third valve fitting 62. In the example shown, the process fluid flow of the first and second pipe portions 101, 102 is combined again downstream of the valve fittings 52 and 62. Consequently, the valve fittings 52 and 62 are arranged parallel with each other with respect to the process fluid flow. If the valve fittings 52, 62 are both in an open position, a greater throughflow area is available for the process fluid flow. As a result of the communicative connection of the two control devices 20 and 30 via the local bus 120, a corresponding coordination of the control of the valve fittings 52 and 62 can readily be carried out without the superordinate control 80 necessarily having to be configured specifically for this purpose.

In the example of FIG. 1, the local bus interfaces 12, 22 and 32 each have two line connections. In this case, these are preferably a "male" and a "female" line connection. In this case, the local bus 120 is looped through each of the local bus interfaces. Alternatively, it is also possible to provide only one line connection at the local bus interfaces 12, 22, 32, respectively, and to connect it via a T-connector to the local bus 120.

The line portions 121, 122 and/or 123 can not only be used to form the local bus 120 but can additionally also be used to supply voltage to the control devices 10, 20, 30 and/or the manual operation device. For this purpose, the line portions 121, 122 and/or 123 can be constructed with multiple strands. Preferably, the line portions 121, 122 and/or 123 each have two strands for the local bus 120 and two strands for the voltage supply. The voltage supply can be provided by a voltage source which is not shown in FIG. 1 and can be supplied to the first control device 10 via a line portion which is not shown. From there, the supply voltage can be supplied to the control devices 20, 30 and/or the manual operation device by means of the line portions 121, 122 and/or 123.

The connections to the local bus interfaces 12, 22, 32 can be constructed in a corresponding manner to be multi-poled, in particular at least four-poled. Preferably, they are connections for a round plug cabling system, for example, for an M8 or an M12 plug type connector.

If the voltage supply and the local bus are provided via the same line portions, this has the advantage that a networking of the devices via the local bus is produced practically "by itself", that is to say, when the devices are connected to the supply voltage.

It is further possible for one of the participants of the local bus, for example, a control device, a field device or a device of the field level, to provide a gateway function or to be configured as a gateway. Access to other communication channels, such as field bus, WiFi, ISDN, mobile communications, for example, GSM, can be provided via that participant.

What is claimed is:

1. A control assembly in a field level of a process fluid system, the control assembly comprising a process valve unit and a control head positioned on the process valve unit,
    wherein the process valve unit comprises:
        a valve drive; and
        a valve fitting having a movable valve member, and
    wherein the control head comprises:
        a control unit which is configured to receive a control signal from a superordinate control of a control level of the process fluid system;

a communication interface for receiving the control signal from the superordinate control to control the valve drive of the process valve unit in accordance with the control signal; and a local bus interface for communicating with one or more other devices of the field level via the local bus interface, and wherein the control head is used to set a position of the movable valve member in the valve fitting of the process valve unit via the valve drive, and wherein the control unit is configured to allow, via the local bus interface, use of at least one functional unit of the control head by one or more of the devices of the field level, and wherein the functional unit comprises a display unit, an input unit, a sensor unit, an actuator unit, an interface unit, the communication interface, and/or a computation unit.

2. The control assembly according to claim 1, wherein the local bus interface is an interface for a multi-master bus.

3. The control assembly according to claim 1, wherein the control unit is configured to carry out control, configuration and/or maintenance processes via the local bus interface in cooperation with a manual operation device which is or can be connected to the local bus interface.

4. The control assembly according to claim 1, wherein the control unit is configured to use at least one functional unit of at least one of the devices of the field level via the local bus interface.

5. The control assembly according to claim 4, wherein the functional unit comprises a display unit, an input unit, a sensor unit, an actuator unit, an interface unit, the communication interface, and/or a computation unit.

6. The control assembly according to claim 1, wherein the control unit is configured to transmit via the local bus interface a message about functional units of the control head to one or more of the devices of the field level.

7. The control assembly according to claim 1, wherein the control unit is configured to receive via the local bus interface a message about functional units of one or more of the devices of the field level.

8. The control assembly according to claim 1, wherein the control unit is configured to transmit via the local bus interface configuration parameters of the control unit to an additional control head.

* * * * *